United States Patent
Deboer et al.

(10) Patent No.: US 7,043,460 B2
(45) Date of Patent: May 9, 2006

(54) WEB BROWSER-BASED OBJECT ORIENTED APPLICATION COMPONENT TEST CLIENT

(75) Inventors: Timothy Gerrit Deboer, Toronto (CA); Timothy Marc Francis, Newmarket (CA); Lawrence Scott Rich, Apex, NC (US); Sheldon Bradley Wosnick, Richmond Hill (CA); Siu Chung Yuen, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 09/871,496

(22) Filed: May 31, 2001

(65) Prior Publication Data
US 2002/0184165 A1 Dec. 5, 2002

(51) Int. Cl.
*G06N 5/02* (2006.01)

(52) U.S. Cl. .......................... 706/10; 707/10

(58) Field of Classification Search .................. 706/10; 707/10, 102, 104.1; 714/38
See application file for complete search history.

(56) References Cited

U.S. PATENT DOCUMENTS

| | | | |
|---|---|---|---|
| 6,557,009 B1 * | 4/2003 | Singer et al. | 707/104.1 |
| 6,591,272 B1 * | 7/2003 | Williams | 707/102 |
| 6,604,209 B1 * | 8/2003 | Grucci et al. | 714/38 |
| 6,643,652 B1 * | 11/2003 | Helgeson et al. | 707/10 |

* cited by examiner

*Primary Examiner*—Wilbert L. Starks, Jr.
(74) *Attorney, Agent, or Firm*—A. Bruce Clay; Yee & Associates, P.C.

(57) ABSTRACT

The universal, Web browser-based Enterprise JavaBean (EJB) test client is itself a Java 2 Enterprise Edition (J2EE) application packaged in a Web archive file. This archive, when extracted, consists of a set of files that are installed on a target application server. The installation makes it possible for a user of a Web browser on a workstation remote from the application server to perform a number of tests on, and invoke, methods in EJB beans that are installed on the staging, or even production, servers. It is also possible to perform tests in real time under real conditions.

18 Claims, 10 Drawing Sheets

WEB BROWSER-BASED OBJECT ORIENTED APPLICATION COMPONENT TEST CLIENT

FIELD OF THE INVENTION

The present invention relates to object-oriented application development and, more particularly, to a Web browser-based object-oriented application component test client.

BACKGROUND OF THE INVENTION

The Java™ programming language is a programming language designed for use in distributed environments such as the Internet. Java enforces an object-oriented programming model and can be used to create complete applications that may run on a single computer or be distributed among servers and clients in a network.

The increasing adaptation of Java to various computing tasks may be attributed to the portability of the language and the fact that Java is an object-oriented programming language. Portability is a name given to the characteristic of Java that allows a source program to be compiled into "bytecode" that can be run anywhere in a network on a server or client that has a Java "Virtual Machine". It is then the task of the Java Virtual Machine to interpret the bytecode into code that will run on the computer hardware that is running the Java Virtual Machine. The object-oriented characteristic of Java allows a given object to take advantage of being part of a class of objects and to inherit code that is common to the class. Objects have associated methods. A method can be thought of as one of a set of capabilities or behaviors of a given object.

According to www.whatis.com, an information technology reference, in object-oriented programming and distributed object technology, a "component" is a reusable program building block that can be combined with other components in the same or other computers in a distributed network to form an application. Examples of a component include: a single button in a graphical user interface, a small interest calculator, an interface to a database manager. Components can be deployed on different servers in a network and communicate with each other for needed services. A component runs within a context called a container. Examples of containers include pages on a Web site, Web browsers, and word processors. In its JavaBeans™ application program interface for writing a component, Sun Microsystems calls a component a "Bean". A JavaBean is simply the Sun Microsystems variation on the idea of a component.

Another component model is called an "Enterprise" JavaBean. Enterprise JavaBeans™ have qualities such as security, persistence, transaction capability, multithreading and scalability, among others. Hence, Enterprise JavaBeans have found extensive use in e-commerce applications where such qualities are particularly desirable.

Rapid software development is often impeded by the need to construct supporting software to facilitate testing. Unit-testing a complex Java object usually requires the construction of some kind of test application (test client). In the case of a specialized object, like an Enterprise JavaBean (EJB™), the application code required to facilitate testing can be somewhat complicated. Hand-written test applications can be quite inflexible in that they usually test a single scenario and, if something goes wrong, it can be hard to see where a problem has occurred. This is especially true with test applications that have no user interface because such test applications usually bind the test scenario at compile time.

The result of a test case is usually reviewed using print statements to display the contents of a result object. If the test-case succeeds the programmer may need to change the test application and re-compile before testing a new scenario. If the test case fails, the programmer may have to add more print statements and re-compile before re-testing the scenario.

Enterprise JavaBean Test clients exist. However, typical Enterprise JavaBean test clients are dependent on a particular level of and type of Java runtime environment. Furthermore, such test clients are typically platform dependent and only work within a particular Java development environment. Other EJB test clients also need additional setup and configuration, based on the type of server, the EJB beans that will be tested, etc.

SUMMARY OF THE INVENTION

A Web browser-based object oriented application component test client described herein frees object oriented application component (e.g. Enterprise JavaBean) testing from the confines of particular development environments. Advantageously, the test client can either be used over a network or EJB beans, for example, can be tested from anywhere on the network without having the test client available locally.

In accordance with an aspect of the present invention there is provided a method of facilitating testing of an object-oriented application component. The method includes providing a client side application portion for presenting a view to a user of a Web browser, the view allowing user interactions with the view, where some of the interactions specify given tests to perform on the component. The method further includes executing a server side application portion for receiving indications of the user interactions with the client side application portion and, responsive to the indications, performing the given tests on the component. In another aspect of the present invention there is provided a test client application for performing this method.

In accordance with another aspect of the present invention there is provided, at an application server, a method of facilitating testing of an Enterprise JavaBean. The method includes providing a test client user interface to a workstation over an HTTP link, where the test client user interface is viewed through the use of a Web browser run on the workstation, receiving a selection from the workstation, the selection identifying a given object, where the given object is a home interface or a remote interface of the Enterprise JavaBean, receiving a request from the workstation, where the request is a consequence of user interaction with the test client user interface and includes an indication of a test to perform on the given object, responsive to the request, performing the test on the given object to give a result and sending a response to the workstation over the HTTP link, the response including an indication of the result to be displayed by the user interface. In a further aspect of the present invention, there is provided a software medium that permits a general purpose computer to carry out this method.

In accordance with a further aspect of the present invention there is provided a Web module containing a test client for Enterprise JavaBeans. The test client being operable to present a user interface over a data link, where the user interface may be displayed through the use of a browser application on a remote workstation, the user interface allowing a user at the remote workstation to: select a given object; select a given method of the given object; supply the given method with a parameter; request that the given method be invoked with the parameter; responsive to receiving the request, invoke the method with the parameter to give a result; and present a further user interface to present the result to the user.

In accordance with a still further aspect of the present invention there is provided a computer readable medium containing computer-executable instructions which, when performed by a processor in an application server, cause the processor to present a user interface over a data link, the user interface allowing a user to: browse a Java Naming and Directory Interface namespace; select a given object in the Java Naming and Directory Interface namespace; and receive information regarding the given object.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
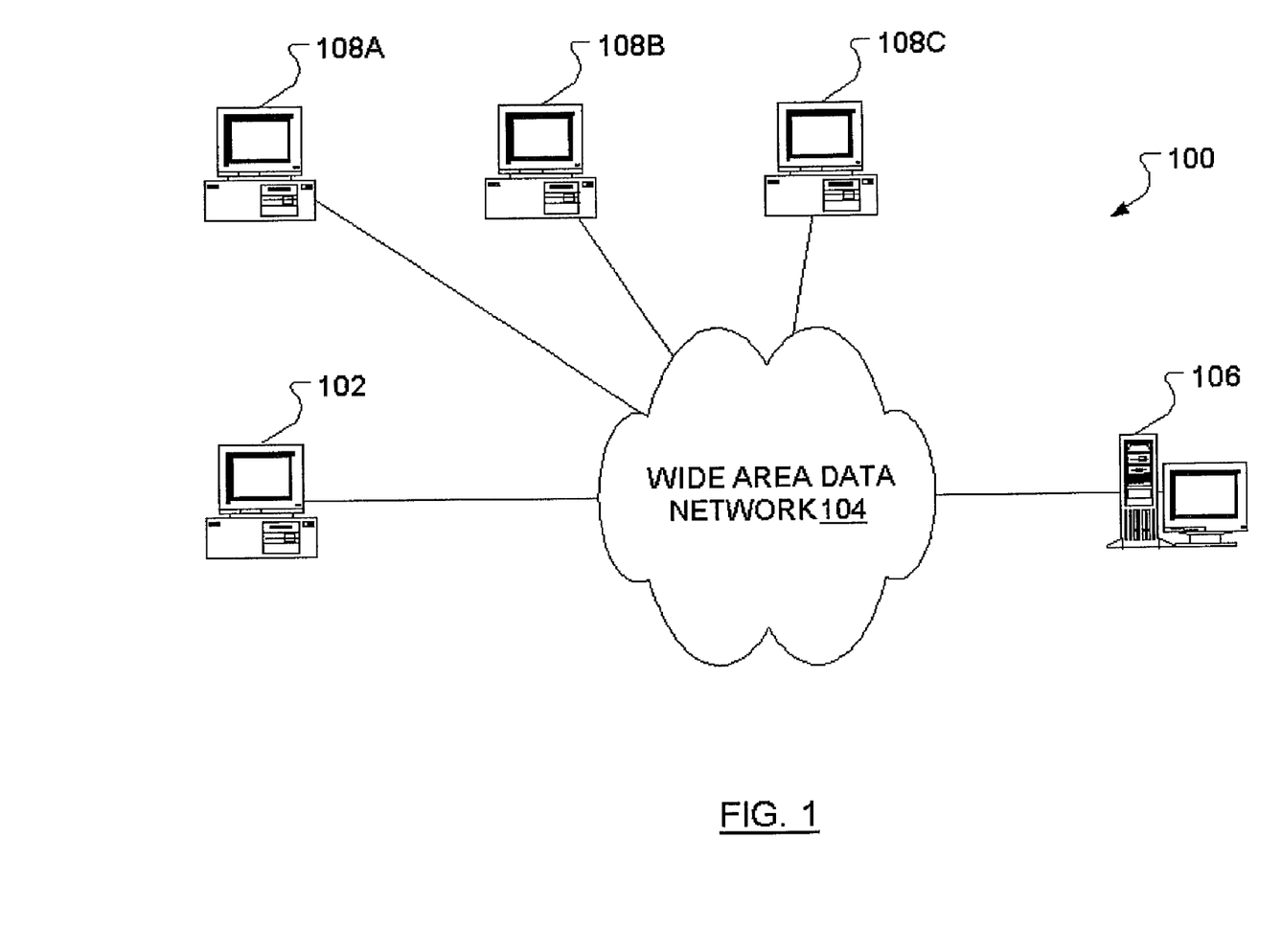
FIG. 1 illustrates a data communications network including an application server for use with an embodiment of the invention.

A simple network 100 is illustrated in FIG. 1 and presents an environment in which the present invention is particularly useful. The network 100 includes a workstation personal computer (PC) 102 for use by a remote user and an application server 106 for providing a client application for testing EJB beans. The PC 102 and the application server 106 communicate with each other through a wide area network 104, such as the well-known Internet, likely using protocols familiar in the Internet environment, such as the Transport Control Protocol and Internet Protocol (TCP/IP) and the Hyper-Text Transfer Protocol (HTTP). Servers within the application server 106 run applications which are comprised largely of Enterprise JavaBeans and these applications are used by users stationed at remote user workstations 108A, 108B, 108C (collectively or individually referred to as 108) for such purposes as e-commerce, e.g., buying books.

The preferred implementation for the present invention is made possible by the Java 2 Platform, Enterprise Edition SDK, known as J2EE™. In this implementation, an EJB server 204 (FIG. 2) may be employed within the application (J2EE) server 106. For a good discussion of all of the terms and concepts related to J2EE and referred to hereinafter, a J2EE tutorial is available at http://java.sun.com/j2ee/tutorial/index.html and is incorporated herein by reference. Several passages from the tutorial have also been referenced herein directly.

Figure 2:
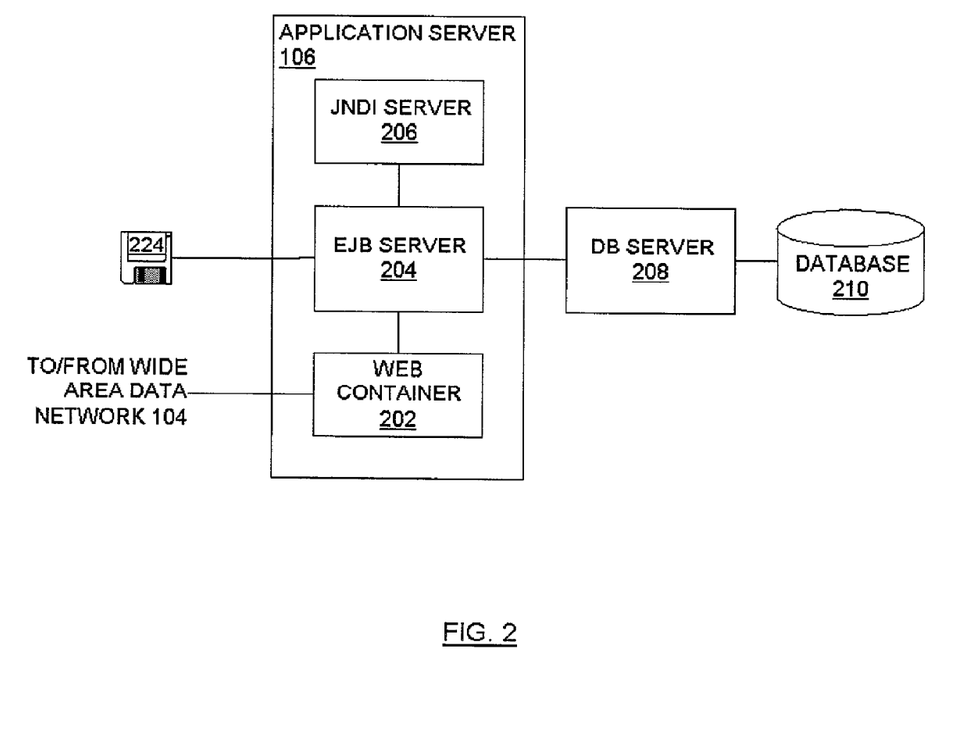
FIG. 2 illustrates the application server of FIG. 1 in greater detail in accordance with an aspect of the present invention.

The application server 106 is illustrated in further detail in FIG. 2 as including several single-purpose servers. The application server 106 may, for instance, include a Web container 202, which may include a conventional HTTP server, for communicating over the Internet 104. The application server 106 may also include the aforementioned EJB server 204, connected to the Web container 202 for providing applications to users stationed at remote user workstations 108, and a JNDI server 206, connected to the EJB server 204. The function of the JNDI server 206 will be discussed hereinafter. A database 210 may be accessible to the EJB server 204 via a database server 208 that provides the EJB server 204 with an interface to the database 210. The EJB server 204 may be loaded with test client software for executing methods exemplary of this invention from a software medium 224 which could be a disk, a tape, a chip or a random access memory containing a file downloaded from a remote source.

In overview, the EJB server 204 includes an embodiment of the present invention to allow the remote user at the PC 102 to employ a Web browser to communicate with the EJB server 204 for the purposes of testing the Enterprise JavaBeans that make up the applications that run on the EJB server 204. In particular, the remote user uses the PC 102 to request a test client from the EJB server 204. The EJB server 204 then provides the test client. The test client is provided to the remote user as part of a dynamic Web page viewed by the remote user using a Web browser. The test client can provide the remote user with a number of informative, interactive views. As the remote user interacts with the views provided by the test client, HTTP requests are sent by the PC 102 to the EJB server 204. The EJB server 204 acts on these HTTP requests and appropriately responds by sending HTTP responses to the PC 102 that act to update the display on the PC 102. In an exemplary instance, the remote user may select an Enterprise JavaBean, select a method of an object of the selected Enterprise JavaBean, supply parameters to the selected method, invoke the selected method and view the result of invoking the method with the supplied parameters.

The test client application may be considered to comprise two sides, a client side and a server side. The client-side of the application is a graphical user interface presented in a Web browser. The client side user interface is presented as a dynamic Web page, employing, for example, dynamic HTML and JavaScript™. Meanwhile, the server side is executed as a J2EE application in an application server, usually the very application server on which the EJB beans, which are to be tested, are also executed.

Alternatively, the server side of the test client may be used equally on various application servers which are in various stages of application production and deployment. For example, typically, a unit test server is included within a development environment. Then, a set of servers that are quite like, or very much like, the server on which the actual applications (made up of EJB beans) are either already deployed or to be deployed. One server, in the set of servers that are like the actual server, is usually called a "staging server", in that the staging server is one stage away from the actual server. The actual server, itself, may be called a "production server" in that the production server is the server that is in use to run business methods with which users interact (business methods are included in EJB beans). The server side of the test client may run on any of these servers. WebSphere, marketed by IBM of Armonk, N.Y., is one example of software for running an application server. WebSphere may be embedded in tools (unit test servers), staging servers and production servers.

Regarding the client side of the test client application, the J2EE model described in the above-referenced tutorial provides an environment for the provision of a thin client application as part of a dynamic Web page that is presented by a Web browser. Several Web browsers are available to the remote user at the PC 102. The most popular of these Web browsers include Microsoft® Internet Explorer and Netscape® Navigator, but many other applications exist for the same purpose. The fact that many applications are available for the same purpose stems from the fact that the material (Web pages) that each Web browser must interpret typically adheres to very specific standards set by the World Wide Web (W3) Consortium that sets such standards. The latest of these standards to be set is Hyper-Text Markup Language (HTML) Specification 4.01, dated Dec. 24, 1999. According to the present invention, the Web browser downloads dynamic Web pages and applets to the PC 102 to give a Web-based test client.

As will be apparent to a person skilled in the art, the future of browsers is not limited to the interpretation of HTML. In fact, applications already exist for the interpretation of Wireless Markup Language (WML) and Extensible Markup Language (XML).

At the EJB server 204, Java Servlet technology and JavaServer Pages (JSP) Technology are used to react to HTTP requests received from the client side of the test client, interact with the EJB beans and supply appropriate HTTP responses to the client side of the test client. According to the above referenced tutorial, Java Servlet technology allows the definition of HTTP-specific servlet classes. A servlet class extends the capabilities of servers that host applications accessed by way of a request-response programming model. Although servlets can respond to any type of request, they are commonly used to extend the applications hosted by Web servers. JSP pages technology allows the placing of snippets of servlet code directly into a text-based document. A JSP page is a text-based document that contains two types of text: static template data, which can be expressed in any text-based format such as HTML, WML, and XML; and JSP elements that determine how the page constructs dynamic content.

When a number of Java classes are required for a particular application, they are often packaged into a Java ARchive (JAR) file. A JAR file has a platform-independent file format that permits many files to be aggregated into one file. Similarly, J2EE components are packaged separately and bundled into a J2EE application for deployment. Each component, along with its related files and a deployment descriptor (DD), is assembled into a "module" and added to a J2EE application. A J2EE application is composed of one or more Enterprise bean modules, Web modules, or application client component modules. A Web module is unit that consists of one or more Web components and a Web deployment descriptor. A JAR archive that contains a Web module is called a Web ARchive (WAR). Using modules makes it possible to assemble a number of different J2EE applications using some of the same components.

Before a remote user can begin to test an Enterprise JavaBean, the remote user must be able to find the particular Enterprise JavaBean for which testing is required. To this end, the Java Naming and Directory Interface™ (JNDI™) may be employed. According to a description found at java.sun.com, JNDI is a standard extension to the Java platform, providing Java technology-enabled applications with a unified interface to multiple naming and directory services in the Enterprise. As part of the Java Enterprise Application Programming Interface (API) set, JNDI enables seamless connectivity to heterogeneous Enterprise naming and directory services. The JNDI function implemented in a particular server, such as the EJB server 204, typically restricts a given search to a particular pre-defined "namespace".

EJB beans come in one of two types, session beans and entity beans. A session bean represents a transient conversation with a client. When the client finishes executing, the session bean and its data are gone. An example of a session bean is a shopping cart in an e-commerce application. In contrast, an entity bean represents persistent data stored in one row of a database table. If the client terminates or if the EJB server 204 shuts down, the underlying services ensure the entity bean data is saved. A user of an e-commerce application may add items found on various pages showing a catalog of items. When finished shopping, the user then indicates that shopping is complete and an order is created from the final state of the shopping cart. In the above e-commerce example, the order created at the end of the shopping session may be stored as an entity bean. Such an entity bean would identify the items ordered, the name of the customer, the delivery address, etc.

An EJB bean has a home interface and may have a remote interface. The home interface defines zero or more methods for managing an Enterprise bean. The home interface of a session bean defines create and remove methods, while the home interface of an entity bean defines create, finder and remove methods. The remote interface defines the business methods callable by a client.

As mentioned above, part of a given test of an EJB bean may involve supplying a method of an object within an EJB bean with some parameters. Notably, these parameters may include simple structures such as integers and strings, but may also include complex structures such as entire objects. In the client side of the test client, the remote user may have several EJB beans open for testing at the same time. To supply an entire object to a method, the remote user could select the object from one of the EJB beans open for testing, copy that object and use the copied object as a parameter for a given method in another one of the EJB beans open for testing.

Various views provided as the client side of the test client are presented in FIGS. 3–9. Each of these views corresponds to a particular function of the test client as a whole. Views include: a Homepage View 300; an EJB Page View 400; an Inspector View 500; a Hierarchy View 600; a JNDI Explorer View 700; a Properties View 800; and a JNDI Objects View 900. These views are discussed hereinafter.

Figure 3:
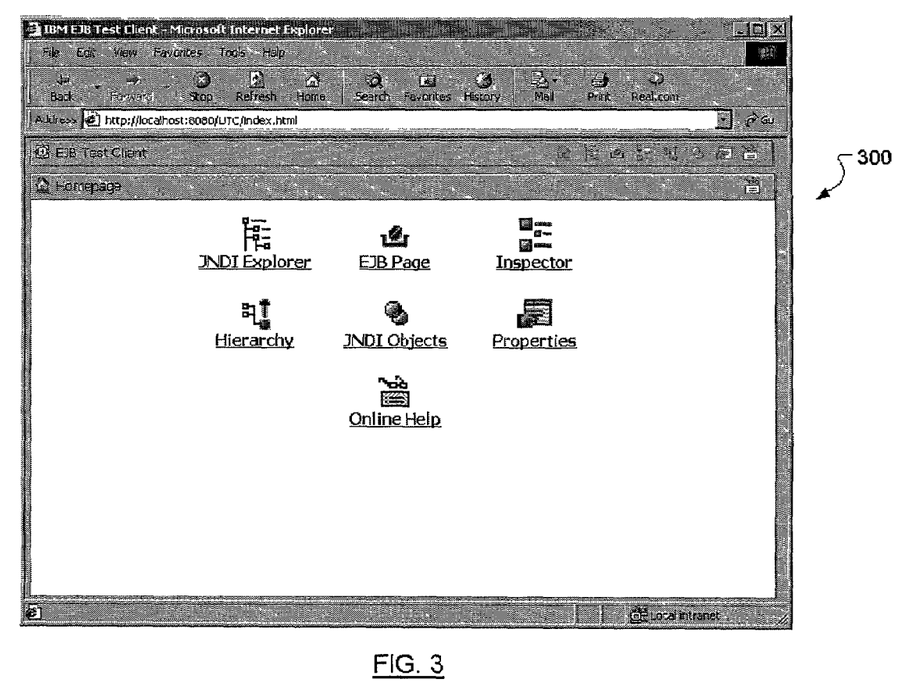
FIG. 3 illustrates an exemplary Homepage View in accordance with an aspect of the present invention.

An exemplary screenshot of the EJB Homepage View 300 is illustrated in FIG. 3. The EJB Homepage View 300 allows the remote user to select among the various views available.

Figure 4:
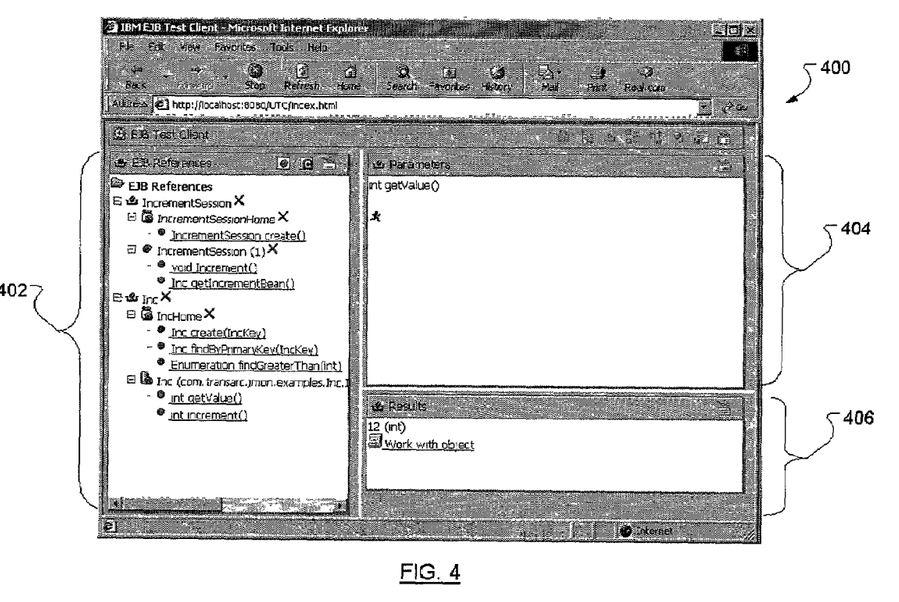
FIG. 4 illustrates an exemplary EJB Page View in accordance with an aspect of the present invention.

An exemplary screenshot of the EJB Page View 400 is illustrated in FIG. 4. The EJB Page View 400 allows the remote user to invoke methods in objects of the EJB home and remote interface classes, as well as other objects that have been accumulated on the Object Clipboard. As illustrated, the EJB Page View 400 is divided into three panes. An EJB View References pane 402, an EJB View Parameters pane 404 and an EJB View Results pane 406. The EJB View References pane 402 displays a collapsible, hierarchical, directory-like structure for the objects within the EJB bean under test. The creation of such collapsible, hierarchical, directory-like structures is well known in the art of Web page authoring using HTML and JavaScript and will not be further discussed herein. The name "EJB References" identifies a folder, of sorts, that acts to group the items in the EJB View References pane 402. The names "IncrementSession" and "Inc" at the next level of the presented hierarchy identify EJB groups. These groupings are arbitrary and are used herein to group an EJB home interface with corresponding EJB objects. Inside each group is an EJB home interface and zero to n session and/or entity beans.

More specifically, within the EJB group called IncrementSession, "IncrementSessionHome" identifies an EJB home interface object. The methods of this EJB home interface object can be used to load any number of real EJB entity or session beans. At the same hierarchical level, the name "IncrementSession" identifies an EJB session bean. At the next hierarchical level down are several public methods named "IncrementSession create( )", "void Increment( )" and "Inc getIncrementBean( )". Selecting one of these public methods will make the method appear in the EJB Page View Parameters pane 404 and allow the remote user to invoke the method with remote user-supplied parameters. The method may also be invoked with objects from the EJB Page View 400 or objects from another open EJB bean.

Similarly, within the EJB group called Inc, "IncHome" identifies an EJB home interface object and, at the same hierarchical level, "Inc" identifies an EJB entity bean. At the next hierarchical level down are several public methods named "Inc create(IncKey)", "Inc findByPrimaryKey(IncKey)", "Enumeration findGreaterThan(int)", "int getValue( )" and "int Increment( )".

The EJB Page View Parameters pane 404 allows the passing of parameters to a method selected in the EJB Page View References pane 402. The EJB Page View Results pane 406 shows the result of having invoked the method given the parameters passed to that method in the EJB Page View Parameters pane 404.

Figure 5:
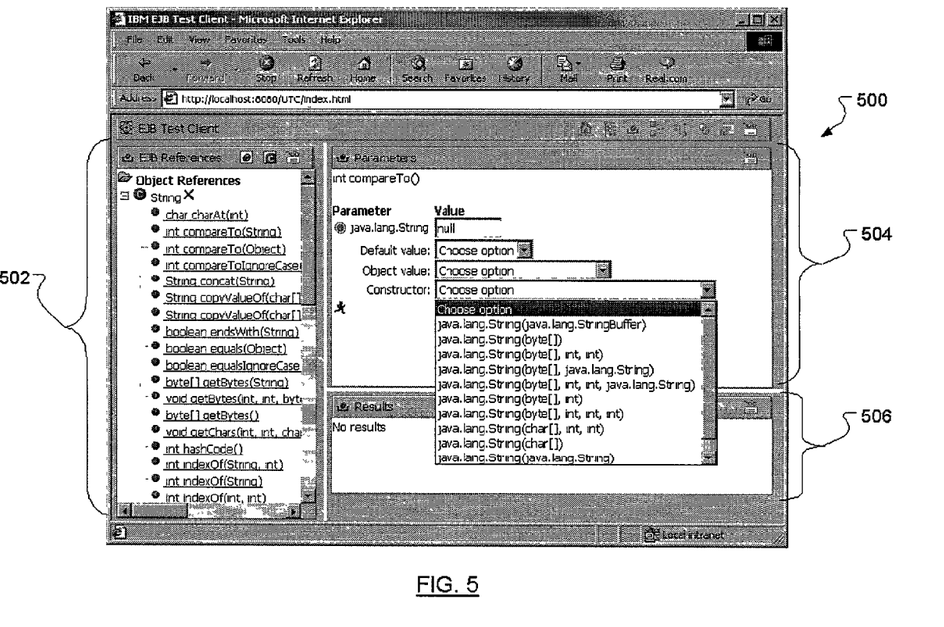
FIG. 5 illustrates an exemplary Inspector View in accordance with an aspect of the present invention.

An exemplary screenshot of the Inspector View 500 is illustrated in FIG. 5. The Inspector View 500 allows the remote user to view the public fields of objects. The Inspector View 500 is divided into three panes, an Inspector View References pane 502, an Inspector View Parameters pane 504 and an Inspector View Results pane 506. The Inspector View References pane 502 shows all objects available to be viewed and any object in the Inspector View References pane 502 may be selected. When an object is selected, the public fields of the selected object appear in the Inspector View Parameters pane 504.

Figure 6:
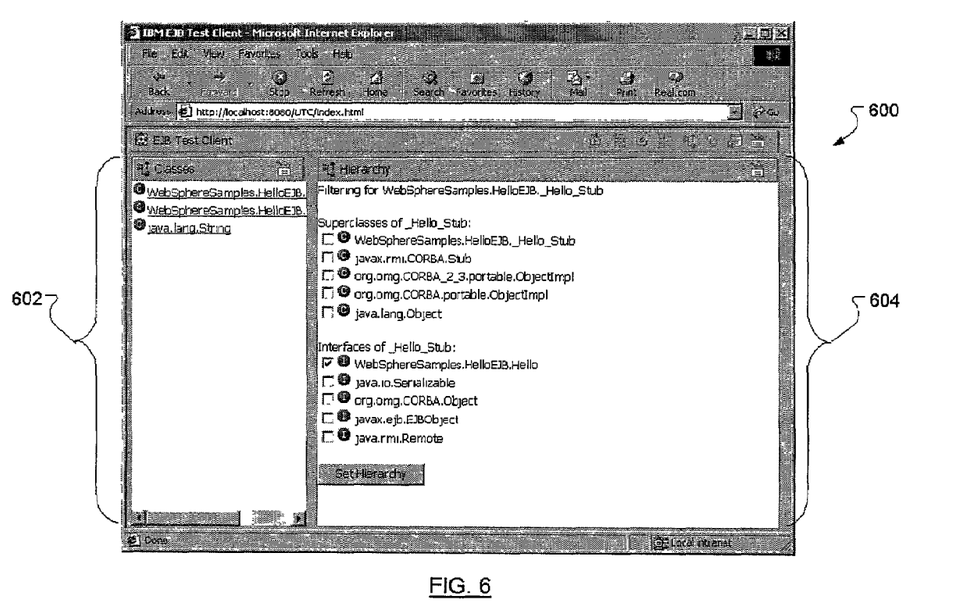
FIG. 6 illustrates an exemplary Hierarchy View in accordance with an aspect of the present invention.

An exemplary screenshot of the Hierarchy View 600 is illustrated in FIG. 6. The Hierarchy View 600 allows the remote user to control which methods are visible in the EJB Page View References pane 402 (FIG. 4). This view also has two panes, a Hierarchy View Classes pane 602 and a Hierarchy View Hierarchy pane 604. By default, only those methods that are directly visible on the class of a given object are shown in the EJB Page View References pane 402. However, using the Hierarchy View Hierarchy pane 604, the remote user can choose to view methods on a superclass of the given object or even filter such that only methods on a particular interface are shown in the EJB Page View References pane 402.

Figure 7:
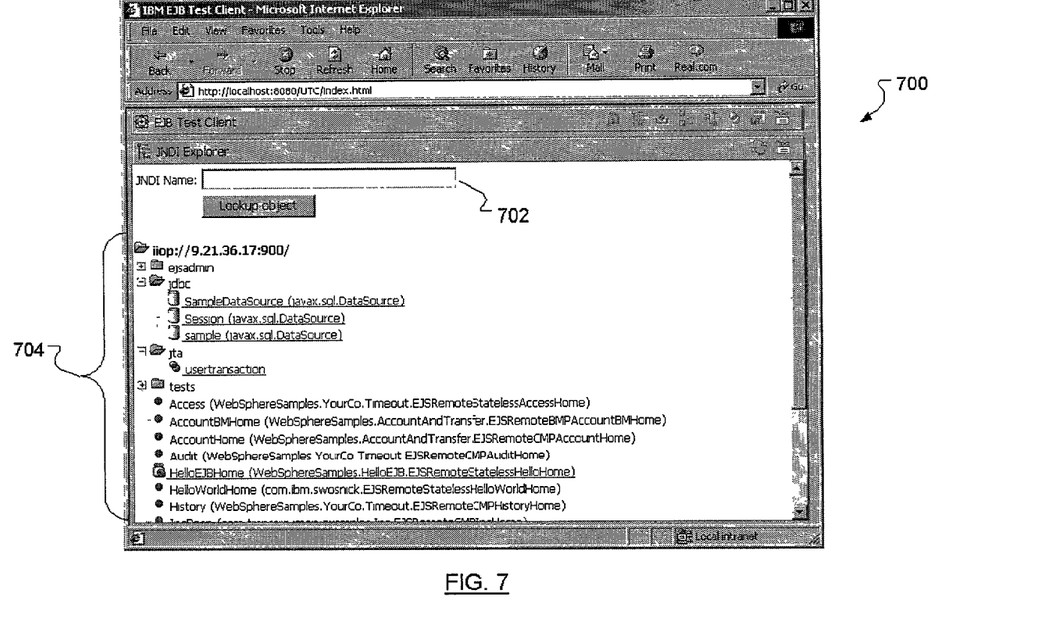
FIG. 7 illustrates an exemplary JNDI Explorer View in accordance with an aspect of the present invention.

In the exemplary screenshot of the JNDI Explorer View 700, illustrated in FIG. 7, a JNDI View Object pane 704 provides a graphical representation of the namespace of the JNDI server. Root contexts in the JNDI namespace are displayed as folders. The JNDI View 700 allows the remote user to browse through the hierarchy and, optionally, load EJB beans directly from this view. The JNDI Explorer View 700 also allows the remote user to load an EJB bean that is to be tested by directly typing in the JNDI name of the EJB bean in an EJB entry window 702.

Figure 8:
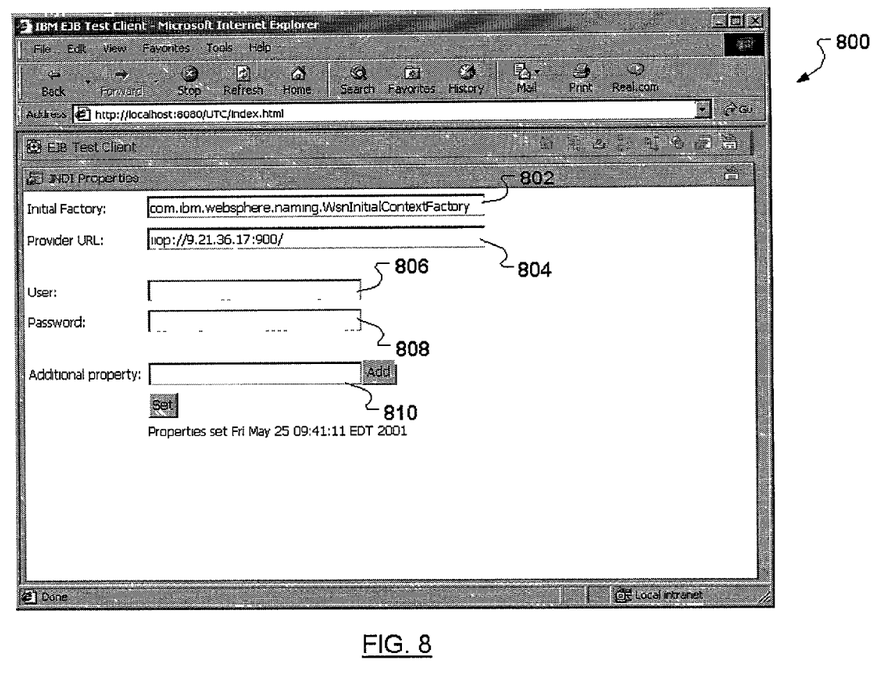
FIG. 8 illustrates an exemplary Properties View in accordance with an aspect of the present invention.

An exemplary screenshot of the JNDI Properties View 800 is illustrated in FIG. 8. The JNDI Properties View 800 provides an Initial Factory entry window 802 and a Provider URL entry window 804 for the remote user to specify the Initial Factory and the Provider URL for use during JNDI lookup. An Initial Factory is a class that is responsible for creating the initial context of an EJB bean and is usually specific to the vendor of the EJB bean since the Initial Factory constructs the context for a specific implementation. To test EJB beans running in a different installation of an application server, or on an application server supplied by a different vendor than the original, the remote user may modify the Provider URL with the IP address of the remote installation. The remote installation may have security measures in place. Consequently, the JNDI Properties View 800 provides a User window 806 and a Password window 808 for supplying authentication information to the remote installation. It may also be that the remote installation requires additional properties to be supplied. These properties may be supplied via an Additional Properties window 810.

Figure 9:
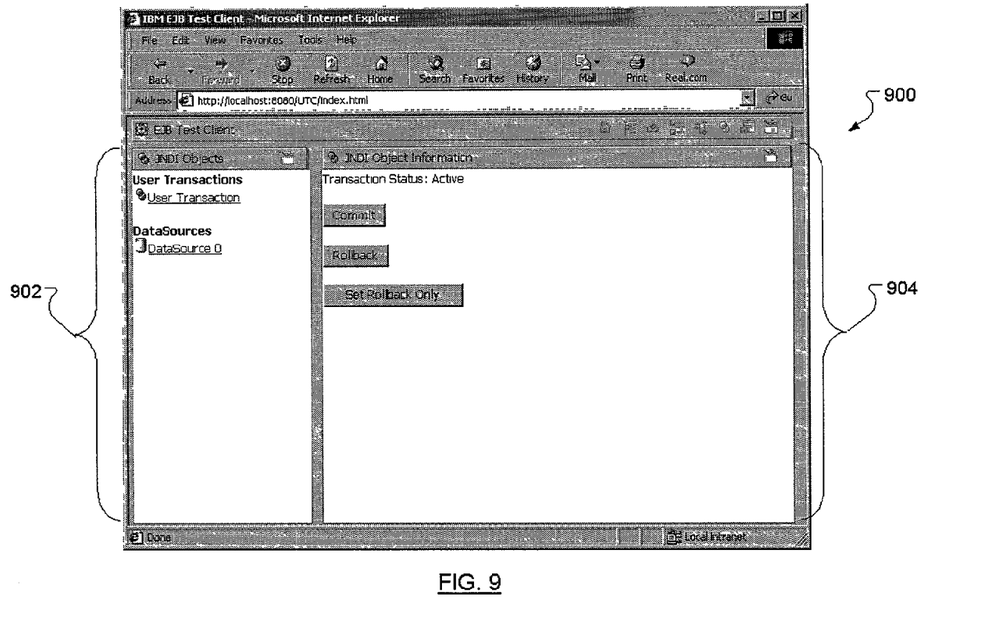
FIG. 9 illustrates an exemplary JNDI Objects View in accordance with an aspect of the present invention.

An exemplary screenshot of the JNDI Objects View 900 is illustrated in FIG. 9. The JNDI Objects View 900 allows the remote user to obtain additional information regarding user transactions and data sources, which are objects that may be associated with an EJB bean and may be found in the JNDI Explorer View 700. The JNDI Objects View 900 provides a JNDI Objects pane 902, for browsing user transactions and data sources, and a JNDI Object Information pane 904, for providing additional information regarding user transactions and data sources.

In operation, the remote user at the PC 102 (FIG. 1) enters a Uniform Resource Locator (URL) for the application server 106 in the address field of a Web browser. The application server 106, in particular, the Web container 202, responds with a Web page. This Web page may combine HTML and JavaScript to present an initial view such as the EJB Homepage View 300 of FIG. 3. To specify the name of the EJB bean for which testing is desired, the remote user uses the mouse pointer to select the JNDI Explorer View link. The Web browser, responsive to the selection of the JNDI View link, sends a HTTP request to the application server for a JNDI View. The Web container 202, upon receiving the HTTP request and in conjunction with the EJB server 204 and the JNDI server 206, formulates, and sends to the PC 102, a Web page such as the JNDI View 700 shown in FIG. 7.

While presented with the JNDI View 700, the remote user may select a particular EJB bean and use the mouse pointer to select the EJB Page View icon (one of a set of icons presented in the top right corner of each view). The Web browser, responsive to the selection of the EJB Page View icon, sends a HTTP request to the application server for an EJB Page View of the selected EJB bean. The Web container 202, upon receiving the HTTP request and in conjunction with the EJB server 204, formulates and sends a Web page such as the EJB Page View 400 shown in FIG. 4.

Alternatively, while presented with the JNDI View 700, the remote user may select a particular EJB bean and use the mouse pointer to select the Inspector View icon. The Web browser, responsive to the selection of the Inspector View icon, sends an HTTP request to the application server for an Inspector View of the selected EJB bean. The Web container 202, upon receiving the HTTP request and in conjunction with the EJB server 204, formulates and sends a Web page such as the Inspector View 500 shown in FIG. 5. With the Inspector View 500, the public fields of any of the objects in a given EJB bean may be viewed.

While presented with the EJB Page View 400 of FIG. 4, the user may select a method in the EJB Page View References pane 402. Such a selection is interpreted by the Web browser and an HTTP request is sent to the application server 106 for an update to the EJB Page View Parameters pane 404. The servlets executing on the EJB server 204 interpret the HTTP request, as received by and transferred from the Web container 202, and generate an HTTP response that causes the Web browser to update the EJB Page View Parameters pane 404. The update to the EJB Page View Parameters pane 404 may allow the remote user to supply the selected method with parameters and provide an indication that the selected method should be invoked using the supplied parameters. Such an indication is interpreted by the Web browser and, as a result of this interpretation, an HTTP request is then sent to the application server 106. Subsequent to receiving the HTTP request, the EJB server 204 handles the invocation of the selected method, given the supplied parameters. The result of the invocation of the selected method is used to formulate an updated EJB Page View. In particular, the EJB Page View Results pane 406 is updated to show the result of the method invocation. This updated EJB Page View Web page is then sent to the PC 102 and the Web browser executed thereon updates the display seen by the remote user accordingly.

As discussed above, the result may be an integer, as shown in FIG. 4, a string or an object, among other possible results. In the case wherein an object is the result of the invocation of the selected method with the supplied parameters, this resultant object may become the focus of the EJB Page View 400, i.e., the resultant object may be viewed in the EJB Page View References pane 402. Once viewed in the EJB Page View 400, the resultant object may be tested, as described above with regard to objects as part of EJB beans.

The remote user may want to subject the resultant object to scrutiny. To this end, a selection of the Inspector View will cause an HTTP request to be sent to the application server 106 for a change of view on the client side of the test client. The EJB server 204 complies with this HTTP request by formulating, and sending to the PC 102, a Web page much like the Inspector View 500 shown in FIG. 5.

Where the resultant object is unfamiliar to the remote user, the remote user may choose to view the object in greater detail. Perhaps the remote user would prefer to view the objects that are inherited by the resultant object from its superclass, or other hierarchically high objects. To this end, and with the resultant object shown in the EJB Page View, the remote user may use the mouse pointer to select the Hierarchy View icon. As a consequence of this selection, the Web browser sends an HTTP request to the application server 106. The servlets at the EJB server 204, upon receipt of the HTTP request for a Hierarchy View, formulate a Web page of Hierarchy View like the Hierarchy View 600 shown in FIG. 6. This View is sent as an HTTP response to the HTTP request and the Web browser updates the display accordingly. Using the Hierarchy View, the remote user may select a level of detail required to be seen in the EJB Page View References pane 402 for the resultant object. An indication of the selected level of detail is transferred to the application server 106 as an HTTP request. Upon receipt of the indication of the requested level of detail, the level is noted, but no response is required to update the display on the client side of the test client. However, once the remote user indicates, through a mouse selection, that an EJB Page View of the resultant object is required, the EJB Page View sent in an HTTP response to this HTTP request will include the selected level of detail.

Figure 10:
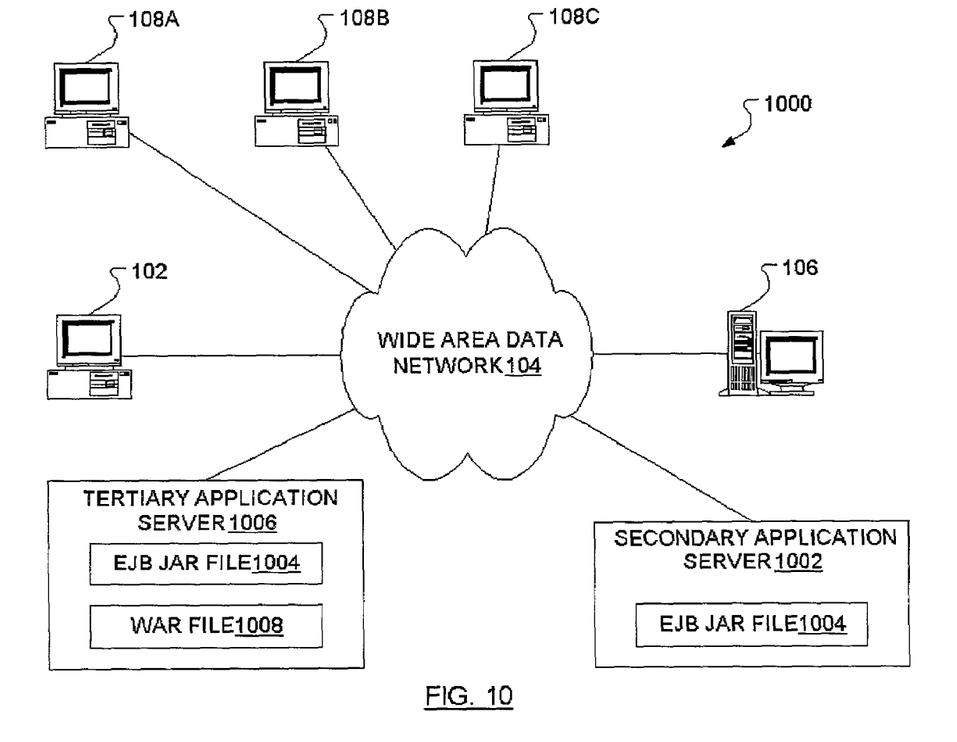
FIG. 10 illustrates an alternative to the data communications network of FIG. 1 including secondary and tertiary application servers for use with an embodiment of the invention.

The present invention has been implemented as a tooling plug-in for a product marketed by IBM as "Eclipse WebSphere Studio Advanced (WSA) Server". With a view to FIG. 10, it may be that the remote user at the PC 102 would like to use the test client provided by the (primary) application server 106 to browse and test EJB beans on a secondary application server 1002. As long as the EJB beans on the secondary application server 1002 are in the current JNDI namespace, the remote user may use the JNDI View 700 (FIG. 7) to browse, select and test the EJB beans. However, the EJB beans of the secondary application server 1002 may not be in the current JNDI space. Assuming the secondary application server 1002 includes a JNDI server, the remote user may use the Properties View 800 (see FIG. 8) to specify, in the Provider URL entry window 804, a URL for the JNDI server of the secondary application server 1002. It may also be necessary for the remote user to specify an Initial Factory in the Initial Factory entry window 802.

The server side of the test client that is an embodiment of the present invention may be used in servers other than the server where the EJB beans under test will be, or are, executed. As stated above, the server side of the test client is a J2EE application packaged in a WAR file. The server-side test client WAR file may, for instance, be supplied to the secondary application server 1002 in FIG. 10. It may be assumed, for the sake of this example, that the secondary application server 1002 executes the same Eclipse WSA Server product as the primary server 106. If the EJB beans that are to be run on the primary application server 106 are to be tested on the secondary application server 1002, it is necessary that the secondary application server 1002 be supplied with an EJB JAR file 1004 that contains the EJB beans to be tested. The remote user may then use the client side of the test client presented at the PC 102 by the Web browser to exchange HTTP requests and responses with the secondary application server 1002 to test the EJB beans.

A further challenge arises where the server-side test client WAR file is to be used on a tertiary application server 1006, which, for the sake of this example, does not execute the same Eclipse WSA Server product as the primary server 106. However, even if the tertiary application server 1006 is supplied with both the EJB JAR file 1004 that contains the EJB beans to be tested, a further archive is required for the test client package to function properly. A WAR file 1008 contains classes that are required by the test client package and may not be assumed to be part of whatever application server software is being executed by the tertiary application server 1006.

Advantages of the present invention are numerous. Using embodiments of the present invention, Enterprise JavaBeans may be tested on the actual production or staging server to which they are deployed. This testing may be performed in real time and from any location in the world from which the server is accessible. The client side of the test client will run on any operating system that supports a basic HTML Web browser without any code or configuration changes. The model underlying the present invention is one wherein the data of interest is at the application server and the operations on the data are executed on the application server. As a result, the client side of the test client contains no application logic. This lack of application logic provides for good performance, as it is the application server that performs any complex computations. The lack of application logic at the client also provides for portability as well as general availability and access.

In that the front-end graphical user interface (HTML, JSP, JavaScript) that makes up the client side of the test client, which may be known as "the view", is well protected from changes made, or to be made in the future, to the server side code of the test client, which may be known as "the model", the model and the view are highly, and purposely, decoupled. Use of the terms "mode" and "view" when describing an application derive from a common programming technique, known as Model View Controller (MVC) architecture. Using MVC architecture, programs are designed so that there is as little dependency as possible between the backend model of the program, the user interface, and the interaction of the user with the program. This functional decoupling allows separate evolution of the server side code and the interface presented to the user, as well as future changes to one or the other without affecting the function of the program as a whole.

Being browser-based, the client side of the test client will run on any operating system, platform, machine and standards-compliant vendor products without necessitating change in code or configuration. The User Interface, being straight HTML and JavaScript running in Netscape® Navigator or Microsoft® Internet Explorer, is immediately understandable by even novice users who are comfortable with "surfing the Internet". The same sorts of actions that are required to use the Web in general are all that is required to perform complex and involved tasks in the client side of the test client.

The present invention supports the creation of, the lookup of and invocation of methods for any given EJB bean on any EJB compliant application server. Results of invocation are immediately fed back to the user and the user may cache the results for subsequent operations or, where the result is an object, the user may choose to test the returned object. Additionally, the test client supports complex relationships for EJB beans such as inheritance and associations.

In review, the test client application may be considered to comprise two sides, a client side and a server side. The client side of the application is executed in a Web browser while the server side is executed as a J2EE application at an application server, often the very application server on which the EJB beans that are to be tested are also executed.

Given that the client side of the test client is browser-based, the Graphical User Interface is separated from the programming logic that is executed at the server. One benefit realized from this separation is that changes may be made to one side of the test client without a necessity to modify the other side. This provides the flexibility to provide a completely different look and feel to the client side of the test client, perhaps through the use of templates designed by professional graphic artists. The only restriction on these templates would be that the templates must run in the browser.

It should be evident to those skilled in the art that, although the present invention has been described in the context of Enterprise JavaBeans, the present invention may be used as a test client for object oriented programs in general.

Other modifications will be apparent to those skilled in the art and, therefore, the invention is defined in the claims.

The embodiments of the invention in which an exclusive property or privilege is claimed are defined as follows:

1. A method in a data processing system for facilitating testing of an object-oriented application component, said method comprising:
   providing a client side application portion for presenting a view to a user of a Web browser, said view allowing user interaction with said view, where some of said interactions specify given tests to perform on said component; and
   executing a server side application portion for receiving indications of said user interactions with said client side application portion and, responsive to said indications, performing said given tests on said component.

2. The method of claim 1 wherein said object-oriented application component is an Enterprise JavaBean.

3. The method of claim 2 where a runtime execution environment in which said given tests on said Enterprise JavaBean are performed is the same runtime execution environment in which said server side application portion is executed.

4. A test client application for object-oriented application components in a data processing system comprising:
   a client side application portion for presenting a view to a user of a Web browser, said view allowing user interactions with said view, where some of said interactions specify given tests to perform on an object-oriented application component; and
   a server side application portion for receiving indications of said user interactions with said client side application portion and, responsive to said indications, performing said given tests on said component.

5. The test client application of claim 4 wherein said object-oriented application component is an Enterprise JavaBean.

6. The test client application of claim 4 wherein said client side application is described using Hyper-Text Markup Language and JavaScript.

7. The test client application of claim 6 wherein said client side application is further described using JavaScript.

8. The test client application of claim 4 wherein said server side application is implemented as JavaServer Pages.

9. At an application server, a method of facilitating testing of an Enterprise JavaBean in a data processing system, said method comprising:
   providing a test client user interface to a workstation over an HTTP link, where said test client user interface is viewed through the use of a Web browser run on said workstation;
   receiving a selection from said workstation, said selection identifying a given object, where said given object is a home interface or a remote interface of said Enterprise JavaBean;
   receiving a request from said workstation, where said request is a consequence of user interaction with said test client user interface and includes an indication of a test to perform on said given object;
   responsive to said request, performing said test on said given object to give a result; and
   sending a response to said workstation over said HTTP link, said response including an indication of said result to be displayed by said user interface.

10. The method of claim 9 wherein said performing said test on said given object comprises invoking a method of said object.

11. The method of claim 9 wherein said test client user interface further provides a view that allows said user of said workstation to browse Enterprise JavaBeans in a given Java Naming and Directory Interface (JNDI) namespace.

12. The method of claim 11 wherein said test client user interface further provides a view that allows said user of said workstation to specify a particular JNDI server on which to allow said user to browse.

13. The method of claim 9 wherein said test client user interface further provides a view that allows said user of said workstation to specify a given Enterprise JavaBean.

14. The method of claim 13 wherein said test client user interface further provides a view that allows said user of said workstation to review home interface objects of said given Enterprise JavaBean.

15. The method of claim 14 where said Enterprise JavaBeans may inherit objects from a set of hierarchically higher Enterprise JavaBeans and wherein said test client user interface further provides a view that allows said user of said workstation to specify a sub-set of said set of hierarchically higher Enterprise JavaBeans from which to display methods in said view that allows said user of said workstation to review said objects.

16. A computer readable medium containing computer-executable instructions which, when performed by a processor in an application server, cause the processor to:
   provide a test client user interface to a workstation over an HTTP link, where said test client user interface is viewed through the use of a Web browser run on said workstation;
   receive a selection from said workstation, said selection identifying a given object, where said given object is a home interface or a remote interface of said Enterprise JavaBean;
   receive a request from said workstation, where said request is a consequence of user interaction with said test client user interface and includes an indication of a test to perform on said given object;
   perform said test on said given object to give a result, responsive to said request; and
   send a response to said workstation over said HTTP link, said response including an indication of said result to be displayed by said user interface.

17. A Web module containing a test client for Enterprise JavaBeans, in a data processing system said test client operable to:
   present a user interface over a data link, where said user interface may be displayed through the use of a browser application on a remote workstation, said user interface allowing a user at said remote workstation to:
   select a given object;
   select a given method of said given object;
   supply said given method with a parameter;
   request that said given method be invoked with said parameter;
   responsive to receiving said request, invoke said method with said parameter to give a result; and
   present a further user interface to present said result to said user.

18. A computer readable medium containing computer-executable instructions which, when performed by a processor in an application server, cause the processor to:
   present a user interface over a data link, said user interface allowing a user to:
   browse a Java Naming and Directory Interface namespace;
   select a given object that is to be tested from said Java Naming and Directory Interface namespace; and
   receive information regarding said given object; and
   perform a test on said given object.

* * * * *